UNITED STATES PATENT OFFICE.

LEVANDER D. JONES, OF DALLAS, TEXAS, ASSIGNOR OF THREE-FIFTEENTHS TO HERBERT D. DEACON AND EIGHT-FIFTEENTHS TO ZEBINA E. MARVIN, BOTH OF DALLAS, TEXAS.

PROCESS OF TREATING COTTON-STALKS.

1,257,080.

Specification of Letters Patent. Patented Feb. 19, 1918.

No Drawing. Application filed May 10, 1917. Serial No. 167,769.

*To all whom it may concern:*

Be it known that I, LEVANDER D. JONES, a citizen of the United States, residing at Dallas, in the county of Dallas and State of Texas, have invented certain new and useful Improvements in Processes of Treating Cotton-Stalks, of which the following is a specification.

This invention relates to the treatment of cotton stalks preferably including root, stem and branches, to obtain therefrom fiber adapted for various uses in the arts, notably as a mattress filling, an upholstering material and for use in making binder and similar twines, in paper making and as a substitute for cotton in the manufacture of explosives.

Many unsuccessful attempts have been made to so treat cotton stalks as to render them adapted for some other practical use than as a fertilizer. It has been sought to produce a serviceable fiber therefrom by the use of processes which are successfully employed in the treatment of other fibrous stalks such as hemp, jute, and ramie, but it has been found that such processes cannot be used with success in the treatment of cotton stalks. Numerous other attempts to prepare serviceable fiber from this source have been tried but thus far without practical success.

Now I have discovered a process whereby fiber adapted for many of the uses for which hemp and other similar vegetable fibers are employed, may be obtained from cotton stalks at a comparatively low cost.

In the practice of my process, I subject the stalks to a disintegrating action, preferably by passing them through heavy crushing rolls adapted to thoroughly crush the stalks. Pairs of crushing rolls adapted to apply a substantially uniform crushing action on the stalks are best adapted for use in this disintegrating treatment. During this crushing treatment and also preferably prior thereto, the stalks are subjected to the action of steam. I have found it advantageous to first steam the stalks, pass them through the first set of rolls while maintaining the action of the steam thereon, then continuing the action of the steam thereon and passing the crushed and steamed stalks through a second and sometimes, through a third pair of crushing rolls, steam being continuously applied to the stalks from the beginning of the crushing treatment until they are subjected to the action of the last crushing rolls.

The steamed and crushed stalks may be conveyed from one pair of crushing rolls to another by any suitable means, such for example as a traveling apron.

After passing through the last pair of crushing rolls the crushed stalks are subjected to the action of a saponaceous alkali bath, which is preferably maintained at about boiling temperature and in this bath the crushed stalks are treated for approximately from one to four hours according to the age and condition of the stalks. For the treatment of cotton stalks as ordinarily obtained I have secured satisfactory results by continuing the treatment for about one hour.

In the treating bath referred to, I preferably employ caustic soda and soap in the preferred proportions of four parts of caustic soda to one part of soap, the solution being of a strength of from one to four degrees Baumé. In treating old or very dry stalks the strength of the solution may be advantageously increased or, in the treatment of ordinary stalks, a stronger solution than that indicated may be employed and the time of treatment correspondingly lessened, as will be understood by those familiar with chemical manipulation.

Instead of employing caustic soda I may employ caustic potash and in place of using soap I may employ soap stock or foots obtained as a residue in refining cottonseed oil. I may also employ fats or oils, preferably vegetable oils such as cottonseed oil, with the alkali, soap being obtained by the saponification of such foots, fat, oil, or the like, in the practice of the process. Where oils or fats are employed in place of soap, they are preferably used in such proportions that the resulting soap will be in approximately the proportions of one part of the soap to four parts of the caustic alkali.

I have obtained some measure of success by the employment of sulfid of soda or a mixture of approximately equal parts of soda ash and caustic lime in place of caustic soda in the treating bath.

Samples of the crushed stalks under treatment in the bath referred to may be examined from time to time and the treatment continued until a test sample shows the fiber of the stalks to be in fine, soft, silky thread-like masses readily separable from the woody (undisintegrated) structure or particles of the stalks. The mixture of fiber and woody particles is then withdrawn from the bath and passed through squeezing rolls to press out the larger part of the saponaceous alkali solution from the mass. The thus partially dried mass is then passed through a bath of water maintained at preferably about 112° F., to wash the fiber and associated woody matter free from the alkali. The washed material may be advantageously bleached by passing it through a dilute solution of chlorin water of any desired strength according to the bleaching action desired, and preferably maintained at about 120° F. In some cases I have obtained advantageous results by using the bleaching bath as a combined washing and bleaching bath, passing the mass direct from the squeezing rolls referred to into such washing and bleaching bath.

It will be understood that the strength of the bleaching bath may be varied according to the material under treatment, some fibers requiring a much stronger solution than others. The strength of the bleaching solution will also depend upon the use to which the fiber is to be put, it being understood that the bleaching bath will be made of a strength to produce fiber of the desired color.

Where I employ separate baths for washing and for bleaching, I have found that a very considerable part of the woody particles may be floated away from the fiber in such bath. This may also be similarly accomplished where I employ a combined washing and bleaching bath. Where separate washing and bleaching baths are employed I have found it possible to separate by flotation a large part of the woody matter from the fiber.

It will be understood that in some cases, as for example, where the fiber is intended for use as a mattress filling or as an upholstering material the bleaching operation may be omitted.

After the fiber has been washed and woody matter removed as herein described, it is passed through squeezing rolls to partially dry it and is then dried in any desired manner as by exposure to the atmosphere or by the use of any suitable drying means.

After being dried, the material is adapted for use in the manufacture of paper. If intended for other purposes it is freed from the woody structure remaining therein and prepared for the other uses specified by passing it through a jute picker. It may then be advantageously passed through a carder. I have obtained particularly satisfactory results by passing the dried fiber through an ordinary jute picker and then through a garnet machine.

In some cases, I have obtained good results by an initial treatment of the stalks with hot water, the stalks being subjected to the action of water at or near boiling temperature for from one to four hours instead of subjecting the stalks to the action of water in the form of steam.

I have found that it is particularly advantageous in the practice of my process, to combine the disintegrating and steaming treatments, the best results being obtained by passing the stalks through the crushing rolls while actually being subjected to the action of steam and to maintain the contact of the steam with the stalks from the time of passing through the first pair of crushing rolls until immerging from the last pair of crushing rolls. From my experience it appears that the steam serves to protect the fiber during the disintegrating treatment whereby a superior product is obtained.

I have also found from experience that it is particularly advantageous to employ a saponaceous alkali bath comprising soap and caustic alkali in the approximate proportions of one part of soap to four parts of the caustic alkali.

While I have specifically described the preferred practice of my process it is to be understood that the details of procedure and proportions of ingredients may be widely varied and that chemical equivalents of the reagents employed may be used without departing from the spirit of the invention or the scope of the subjoined claims.

Having thus described my invention, I claim:

1. The herein described process of treating cotton stalks, which consists in disintegrating the stalks in the presence of steam, subjecting the disintegrated stalks to the action of a hot solution of caustic alkali and soap, and drying the treated mass.

2. The herein described process of treating cotton stalks, which consists in disintegrating the stalks by the action of crushing rolls in the presence of steam, subjecting the disintegrated stalks to the action of a hot solution of caustic alkali and soap and drying the treated mass.

3. The herein described process of treating cotton stalks, which consists in softening the stalks by the action of water, disintegrating the softened stalks by crushing them in the presence of steam, subjecting the disintegrated stalks to the action of a hot solution of caustic alkali and soap, and drying the treated mass.

4. The herein described process of treating cotton stalks, which consists in crushing the stalks in the presence of steam, subjecting the treated mass to the action of a hot solution containing caustic alkali and soap in the approximate proportions of four parts of caustic alkali to one part of soap, and drying the treated mass.

5. The process of treating cotton stalks, which consists in crushing the stalks in the presence of steam, subjecting the crushed stalks to the action of a hot solution of caustic alkali and soap, washing the treated material, separating woody particles from the fiber by flotation, and drying the treated mass.

6. The process of treating cotton stalks, which consists in crushing the stalks in the presence of steam, subjecting the crushed stalks to the action of a hot solution of caustic alkali and soap, washing the treated material, separating woody particles from the fiber by flotation, drying the fiber, and removing the remaining woody particles from the fiber.

7. The herein described process of treating cotton stalks, which consists in crushing the stalks in the presence of steam, subjecting the crushed stalks to the action of a hot solution containing caustic alkali and soap in the approximate proportions of four parts of caustic alkali to one part of soap, freeing the treated material from caustic alkali and soap by washing in water, separating woody particles from the fiber by flotation, bleaching the fiber, drying the same and removing the remaining woody particles from the fiber by picking and carding.

8. In the herein described process of treating cotton stalks, the steps of simultaneously subjecting the stalks to a crushing pressure without substantial grinding action whereby the fiber is more or less separated without material transverse breakage, and to the action of steam.

9. In the herein described process of treating cotton stalks, the steps of subjecting the stalks to a crushing pressure without substantial grinding action whereby the fiber is more or less separated without material transverse breakage, and subjecting the same to a hot solution of caustic alkali and soap.

In testimony whereof I affix my signature in presence of two witnesses.

LEVANDER D. JONES.

Witnesses:
 JNO. F. MURPHY,
 A. D. DEACON.